April 12, 1966 W. M. ALLEN ETAL 3,245,155
APPARATUS FOR DRYING SAUSAGES AND THE LIKE
Filed May 31, 1962
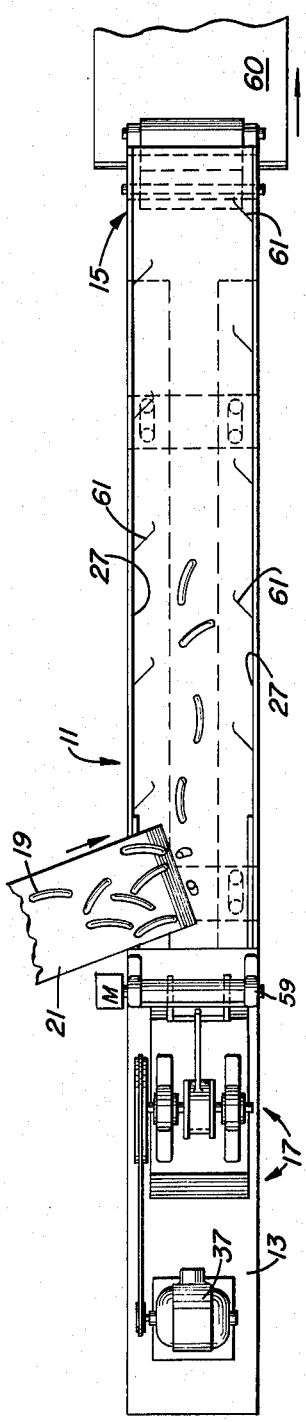
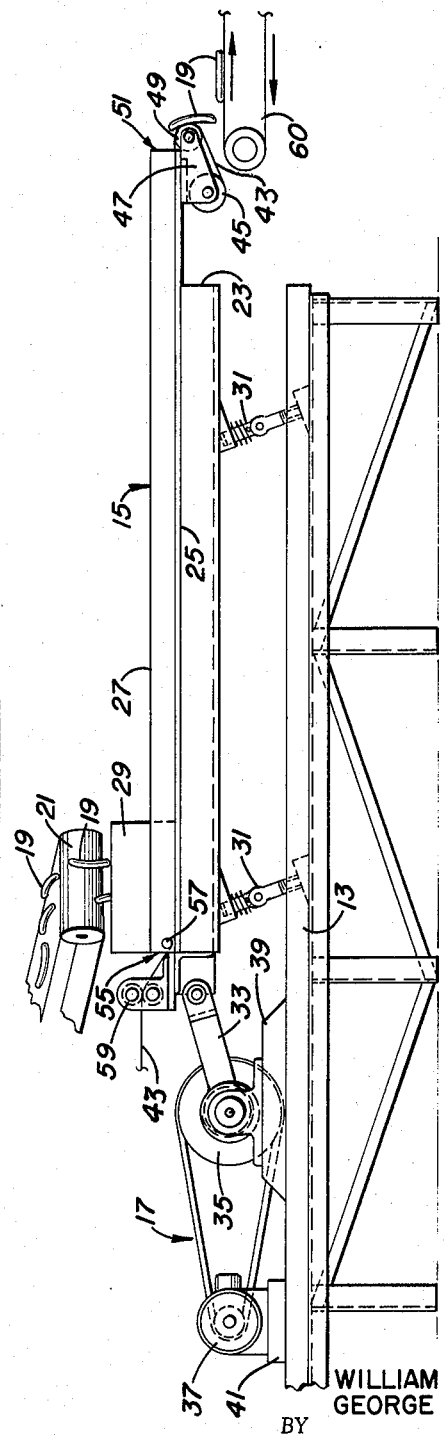
INVENTOR.
WILLIAM M. ALLEN
GEORGE E. MANNING
BY
Gray, Mase & Dunson United States Patent Office 3,245,155
Patented Apr. 12, 1966

3,245,155
APPARATUS FOR DRYING SAUSAGES
AND THE LIKE
William M. Allen and George E. Manning, Columbus, Ohio, assignors, by mesne assignments, to Hoover Ball and Bearing Company, Saline, Mich., a corporation of Michigan
Filed May 31, 1962, Ser. No. 199,000
5 Claims. (Cl. 34—164)

This invention relates to a method and apparatus for drying meat products and, particularly, to improved apparatus for drying sausages.

During the preparation of certain meat products, such as sausages or skinless wieners, usually one or more steps involve the addition of moisture or water to the surface of the meat products. For example, sausages are generally washed in a spray of water or cooled in a bath of water after cooking. As a part of the manufacturing process, the moisture must be removed from the surface of the sausages before they can be packed or stored.

One possible method for removing water from the sausages is to spread them out in trays, or the like, allowing the water to evaporate. This procedure is, however, too slow and is not in keeping with the modern trend toward faster processing methods. Also, if the sausages have been cooled for packing or storage, they would tend to warm up while drying unless the temperature of the drying area were kept low. A low-temperature drying area, without expensive dehumidifying apparatus, would of course reduce the rate of evaporation and increase the drying time still more. Keeping the sausages cool is an important feature, since most cooked sausage mixtures tend to get greasy at temperatures exceeding 60° to 70° F. Other possible drying methods and associated apparatus, such as desiccants in an enclosed area, mechanical removal of moisture by air blast or a stream of dry air directed over the wet surfaces of the meat products are, at present, too slow or too expensive. Directing air on the meat products also has the disadvantage of bringing bacteria and molds to the meat products unless the air is sterilized.

According to this invention, apparatus for drying meat products is provided in which the meat products are placed on a moisture-absorbent mateiral and moved over the absorbent material in a manner that brings all the surfaces of the meat products in contact with the absorbent material.

Also, according to this invention, apparatus for drying meat products is provided that includes a flat surface, an absorbent material covering the flat surface, means for continuously providing a fresh supply of absorbent material on the flat surface, means for continuously depositing wet meat products on the absorbent material, means for moving the meat products on the absorbent material in a manner that brings all the surfaces of the meat products in contact with the absorbent material and means for collecting the dried meat products from the absorbent material.

One advantage of this invention is the decrease in the time required for the drying step in a sausage manufacturing process. Another advantage is that the cooled meat product is maintained at a low temperature during the operation of the drying method of this invention.

Still another advantage is the adaptability of the apparatus to a continuous process in accordance with modern meat manufacturing trends toward rapid and continuous processes. An important feature of this invention is that the drying method is clean and sanitary. The drying material is constantly renewed and very little cleaning of the drying apparatus is necessary.

Still other advantages and features of the invention are apparent from the following description, the drawings relating thereto, and the claims herein set forth.

In the drawings:

FIG. 1 is a plan view of a drying apparatus according to this invention; and

FIG. 2 is an elevational view of the apparatus shown in FIG. 1.

Referring to FIGS. 1 and 2, the drying apparatus 11 is comprised of a base 13 that supports a table 15 and a power unit 17. The meat products, such as sausages 19—19, are deposited on the drying apparatus 11 by suitable means, such as a conveyor 21.

The table 15 includes a frame 23 that supports a flat bed 25 having two upstanding edges such as sides 27—27. A backboard deflector 29 is added to one of the sides 27 opposite the conveyor 21 to prevent the sausages 19—19 from falling over or overshooting the side 27 as they are supplied to the table 15.

The table frame 23 is resiliently connected to the base 13 by supports 31—31. The table frame 23 is also connected by a driving arm 33 to a driving unit 35 that imparts a reciprocating or vibrating motion to the table 15. The vibration unit 35 is driven by suitable power means such as an electric motor 37. Both the frame 39 of the vibrator unit 35 and the frame 41 of the power means 37 are attached to the base 13 of the drying apparatus 11.

The table bed 25 is covered by a moisture-absorbent material 43. The preferred material is paper toweling since it is economical, sanitary, and can be disposed of after it has been used. It is possible to use a more permanent type of material, such as cloth, but such materials require cleaning and drying after each use so that they can be reused in order to keep the drying process economical. The sheet of paper toweling 43 originates from a supply roll 45 that is positioned beneath the level of the table bed 25 and attached to the sides 27—27 by suitable mounts 47—47. The paper towel 43 passes from the supply roll 45 over a first guide roller 49 at the exit end 51 of the table 15. From the guide roller 49, the paper towel 43 passes over the table bed 25 to the entrance end 55 of the table 15. At the entrance end 55 of the table 15, the towel 43 passes beneath a second guide roller 57 and then to a "wringer roll" drive 59, driven by a motor M, that pulls the towel 43 across the length of the table 15.

The vibration unit 35 imparts a specialized motion to the table 15 that is responsible for moving the sausages 19—19 over the towel 43 and moves them in a manner that ultimately brings all surfaces of the sausages 19—19 in contact with the towel 43 several times. The table 15 is first thrust rapidly upward and toward the exit end 51, then it is pulled downward and toward the entrance end 55. The sausages 19—19 that are lying on the towel 43 are momentarily thrust a short distance off the surface of the towel 43 by the upward movement of the table 15. The following downward movement of the table 15 toward the entrance end 55 moves the table 15 beneath the sausages 19—19 as they lose contact with the towel 43. As a result of the movements of the table 15, the sausages 19—19 are "bounced" from the entrance end 55 toward the exit end 51. At the exit end 51, the sausages drop off into a collector or other suitable means of removal, such as a conveyor 60.

The table movement described not only moves the sausages 19—19 across the towel 43 but also causes them to spin and rotate so that all surfaces of the sausage 19—19 are presented to the absorbent material (towel) 43. Still further, the table movement keeps the sausages 19—19 in a single layer ensuring that each sausage 19 is in contact with the towel 43.

There is a tendency for the sausages to slide longitudinally along the sides 27 of the table 15 when they reach the corner between a side 27 and the table bed 25. When this occurs, one portion of the sausage surface remains oriented toward the towel 43. If the sausages were allowed to remain in this position, only one portion of their surface would be dried. In order to prevent this condition, a plurality of deflector fingers 61—61 is provided along the sides 27—27 to guide the sausages 19—19 back toward the center of the towel 43.

In summary, the wet sausages are continuously deposited on a strip of absorbent material. The absorbent material is vibrated in such a manner that the sausages arrange themselves in a single layer and move along the strip. The same vibration agitates the sausages so that ultimately all surfaces of the sausages contact the absorbent material. A fresh supply of absorbent material is supplied continuously and, as the sausages are dried, they are continuously removed from the absorbent material.

It will be understood, of course, that while the forms of the invention herein shown and described constitute the preferred embodiments of the invention, it is not intended herein to illustrate all of the possible equivalent forms or ramifications of the invention. It will also be understood that the words used are not words of limitation, and that various changes, such as changes in shape, relative size, and arrangement of parts may be substituted without departing from the spirit or scope of the invention herein disclosed.

What is claimed is:

1. An apparatus for drying meat products, such as sausages and the like, comprising:
    (a) a table including a horizontally disposed flat surface and two upstanding edges to form a trough having an entrance end and an exit end;
    (b) an absorbent strip of paper covering said flat surface;
    (c) means for continuously supplying and depositing wet sausages on said paper near said entrance end;
    (d) driving means connected to said table, said driving means imparting a vibratory motion to said table having horizontal and vertical components sufficient to move said sausages over said paper from said entrance end to said exit end and to agitate said sausages so that all surfaces of said sausages ultimately contact said paper;
    (e) means for adding paper to said flat surface at said exit end and removing said paper at said entrance end to continuously supply fresh paper to said flat surface; and
    (f) means for collecting the dried sausages as said sausages fall from said exit end.

2. An apparatus for drying meat products such as sausages and the like, comprising:
    (a) a table including a horizontally disposed flat surface and two upstanding edges to form a flat trough having an entrance end and an exit end;
    (b) an absorbent paper strip covering said flat surface, said paper strip originating from a supply roll beneath said exit end and passing over said flat surface to said entrance end;
    (c) a wringer roll drive at said entrance end for engaging said paper strip and continuously pulling a fresh supply of said paper strip from said supply roll;
    (d) means for continuously supplying and depositing wet sausages on said paper strip near said entrance end;
    (e) driving means connected to said table, said driving means imparting a vibratory motion to said table having vertical and horizontal components sufficient to move said sausages over said paper strip from said entrance end to said exit end and to agitate said sausages, so that in the course of passing from the entrance end to the exit end, all surfaces of said sausages ultimately contact said paper strip;
    (f) a plurality of fingers projecting from said two upstanding edges for deflecting said sausages away from said edges; and
    (g) means for collecting the dried sausages as said dried sausages fall from said exit end.

3. Apparatus for drying sausages and the like comprising substantially flat table means having an entrance end adapted to receive wet sausages and an exit end, a strip of absorbent material mounted on the top side of said table means in a covering relation therewith and extending between the entrance and exit ends of said table means, a supply of said absorbent material connected to said strip at the exit end of said table means, means for continuously moving said strip in a substantially horizontal direction from the exit toward the entrance end of said table means so as to continuously remove material from said supply, and driving means connected to said table means imparting a vibratory motion to said table means having vertical and horizontal components sufficient to tumble sausages supported on said strip so as to move said sausages toward said exit end of said table means.

4. Apparatus for drying sausages and the like comprising substantially flat table means having an entrance end adapted to receive wet sausages and an exit end, a strip of absorbent material mounted on the top side of said table means in a covering relation therewith and extending between the entrance and exit ends of said table means, a supply roll of said absorbent material connected to said strip at the exit end of said table means, strip pulling means adjacent the entrance end of said table means for continuously moving said strip in a substantially horizontal direction from the exit toward the entrance end of said table means and continuously remove material from said supply roll, and driving means connected to said table means imparting a vibratory motion to said table means having vertical and horizontal components sufficient to tumble sausages supported on said strip so as to move said sausages toward said exit end of said table means.

5. Apparatus for drying sausages and the like comprising a substantially flat bed table having upstanding edges, said table having an entrance end adapted to receive wet sausages and an exit end from which relatively dry sausages are adapted to be removed, a strip of absorbent material mounted on the top side of said table between said edges in a covering relation with said table and extending between the entrance and exit ends thereof, a supply roll of said absorbent material connected to said strip at the exit end of said table, strip pulling means engaged with said strip adjacent the entrance end of said table for continuously moving said strip in a substantially horizontal direction from the exit toward the entrance end of said table so as to continuously remove material from said supply roll, and driving means connected to said table imparting a vibratory motion to said table having vertical and horizontal components sufficient to tumble sausages supported on said strip so as to move said sausages toward said exit end of said table, and sausage deflector members extending substantially horizontally inwardly from said edges in directions inclined toward said exit end of the table.

References Cited by the Examiner

UNITED STATES PATENTS

| | | | |
|---|---|---|---|
| 2,157,716 | 5/1939 | Muller | 34—164 |
| 2,159,046 | 5/1939 | Paxton | 34—9 |
| 2,177,166 | 10/1939 | Bemis | 34—95 |
| 2,207,278 | 7/1940 | Albrecht | 34—95 |
| 2,465,214 | 3/1949 | Ewing | 34—9 |
| 2,947,410 | 8/1960 | Carrier | 198—220 |

WILLIAM F. O'DEA, *Primary Examiner.*

NORMAN YUDKOFF, *Examiner.*